(12) United States Patent
Kimoto et al.

(10) Patent No.: US 9,957,120 B2
(45) Date of Patent: May 1, 2018

(54) STOWAGE PATTERN CALCULATION DEVICE AND STOWAGE DEVICE FOR STOWING PLURALITY TYPES OF OBJECTS

(71) Applicant: FANUC CORPORATION, Yamanashi (JP)

(72) Inventors: Yuuki Kimoto, Yamanashi (JP); Yoshiharu Nagatsuka, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days. days.

(21) Appl. No.: 15/461,399

(22) Filed: Mar. 16, 2017

(65) Prior Publication Data

US 2017/0267467 A1 Sep. 21, 2017

(30) Foreign Application Priority Data

Mar. 17, 2016 (JP) .................................. 2016-054405

(51) Int. Cl.
*B65G 57/22* (2006.01)
*B25J 9/16* (2006.01)
*B65G 47/90* (2006.01)
*B65G 57/20* (2006.01)
*B65G 61/00* (2006.01)
*G05B 19/418* (2006.01)

(52) U.S. Cl.
CPC ............ *B65G 57/22* (2013.01); *B25J 9/1687* (2013.01); *B65G 47/90* (2013.01); *B65G 47/905* (2013.01); *B65G 57/20* (2013.01); *B65G 61/00* (2013.01); *G05B 19/41865* (2013.01)

(58) Field of Classification Search
CPC .......................... B65G 57/22; G05B 19/41865
See application file for complete search history.

(56) References Cited

U.S. PATENT DOCUMENTS

| 4,692,876 A * | 9/1987 | Tenma ................. B65G 1/1371 414/791.6 |
| 5,501,571 A * | 3/1996 | Van Durrett .......... B65G 61/00 414/21 |
| 6,055,462 A * | 4/2000 | Sato ....................... B25J 9/1687 700/217 |
| 7,047,710 B2 * | 5/2006 | Winkler ............... B65G 1/1378 414/416.11 |

(Continued)

FOREIGN PATENT DOCUMENTS

| JP | 3-158322 A | 7/1991 |
| JP | 3-243535 A | 10/1991 |

(Continued)

*Primary Examiner* — Thomas Randazzo
(74) *Attorney, Agent, or Firm* — Hauptman Ham, LLP

(57) ABSTRACT

A stowage device is equipped with a transport device that transports a plurality of types of objects in a random sequence, and a control device that sets a position of an object inside a containment area. The control device includes a complete pattern selection unit that selects a complete pattern in which an object transported by the transport device can be stowed on the basis of the type of the object and information on an object currently placed in the containment area. The control device includes a position determination unit that determines a position of an object inside the containment area on the basis of the complete pattern.

4 Claims, 15 Drawing Sheets

FIRST STOWAGE SEQUENCE

FIRST COMPLETE PATTERN

(56) References Cited

U.S. PATENT DOCUMENTS

| | | | | |
|---|---|---|---|---|
| 8,244,400 B2* | 8/2012 | Cottone | ............... | B65G 57/03 |
| | | | | 211/24 |
| 8,290,617 B2* | 10/2012 | Ruge | .................. | B65G 61/00 |
| | | | | 700/217 |
| 8,644,984 B2* | 2/2014 | Nagatsuka | ............ | B25J 9/1671 |
| | | | | 414/426 |
| 8,708,637 B2* | 4/2014 | Wolkerstorfer | ...... | B65G 57/035 |
| | | | | 198/614 |
| 8,965,559 B2* | 2/2015 | Pankratov | ........... | G06Q 10/043 |
| | | | | 700/213 |
| 9,067,744 B2* | 6/2015 | Takizawa | ............... | B65G 61/00 |
| 9,315,344 B1* | 4/2016 | Lehmann | ............... | G06Q 10/08 |
| 2009/0069939 A1* | 3/2009 | Nagatsuka | ............ | B25J 9/1671 |
| | | | | 700/258 |
| 2015/0073588 A1* | 3/2015 | Priebe | .................. | B65G 57/00 |
| | | | | 700/217 |
| 2015/0139771 A1* | 5/2015 | Cavelius | ............. | B65G 57/035 |
| | | | | 414/794.7 |
| 2016/0288330 A1* | 10/2016 | Konolige | ............... | B25J 9/1697 |

FOREIGN PATENT DOCUMENTS

| | | | |
|---|---|---|---|
| JP | 8-133482 | A | 5/1996 |
| JP | 9-207043 | A | 8/1997 |
| JP | 2000-7155 | A | 1/2000 |
| JP | 2004-307110 | A | 11/2004 |
| JP | 2009-70078 | A | 4/2009 |
| JP | 2013-71785 | A | 4/2013 |

\* cited by examiner

CONTAINMENT
AREA AFTER
PLACING BOX A

CONTAINMENT
AREA AFTER
PLACING BOX A

STOWAGE PATTERN CALCULATION DEVICE AND STOWAGE DEVICE FOR STOWING PLURALITY TYPES OF OBJECTS

RELATED APPLICATIONS

The present application claims priority to Japanese Patent Application No. 2016-054405 filed Mar. 17, 2016, the disclosures of which is hereby incorporated by reference herein in its entirety.

BACKGROUND OF THE INVENTION

1. Field of the Invention

The present invention relates to a stowage pattern calculation device that calculates a stowage pattern for objects, and to a stowage device that stows objects.

2. Description of the Related Art

A process of transporting objects includes a process of aligning a plurality of objects in a specific containment area. Examples of such a process include a process of stowing, on a pallet, objects transported one by one by a conveyor. A system in which objects transported by such a transport device are stowed in a specific location is known as a palletizing system.

Japanese Unexamined Patent Application Publication No. 2013-71785A describes a stowage device that calculates a combination of boxes on the basis of the sizes of the boxes when there are a plurality of types of boxes of different dimensions. This device is configured to place boxes at the four corners of a box containment means before placing boxes in sections other than the four corners.

SUMMARY OF INVENTION

In object transport processes, objects of a single type are stowed in a specific location in some cases. In such a case, an area in which objects are stowed on a pallet can be predetermined before executing the stowage task. Alternatively, a stowage pattern can be predetermined when the sequence in which a plurality of types of objects are transported has been predetermined.

On the other hand, in object transport processes, the sequence in which a plurality of types of objects are stowed has not been determined in some cases. For example, objects are transported by a conveyor in a random sequence in terms of their types. Hitherto, it has not been possible to appropriately stow objects of a plurality of types transported in a random sequence in a stowage device of conventional technology.

The stowage pattern calculation device of the present invention calculates a pattern in which a plurality of objects are stowed inside a predetermined containment area. The plurality of objects have box shapes, and are of a plurality of types having different dimensions from each other. The stowage pattern calculation device is equipped with a sequence setting unit that selects a plurality of objects and sets a sequence in which the objects are stowed. The stowage pattern calculation device is equipped with a pattern calculation unit that generates a complete pattern in which objects are placed inside the containment area, on the basis of the dimensions of the containment area, the dimensions of the plurality of types of objects, and the stowage sequence set by the sequence setting unit. The stowage pattern calculation device is equipped with a storage unit that stores the complete pattern generated by the pattern calculation unit. The sequence setting unit sets a plurality of sequences. The pattern calculation unit repeatedly executes control for the plurality of sequences, the control being executed so as to set a pattern as a complete pattern in which the objects are contained inside the containment area when the objects are stowed in one of the sequences.

In the above invention, the pattern calculation unit may execute control for arranging the plurality of objects in a predetermined placement direction of the containment area in one of the sequences, and control for stowing an object on the other objects upon the object extending outside the containment area in the placement direction.

A stowage device of the present invention is equipped with a transport device that transports a plurality of types of object in a random sequence, and a robot that places objects transported by the transport device inside a predetermined containment area. The stowage device is equipped with a detection device that detects a type of an object transported by the transport device, and a control device that sets a position of an object inside the containment area. The control device is equipped with a storage unit that stores a complete pattern in which a plurality of objects are placed inside the containment area. The control device includes a complete pattern selection unit that, on the basis of the type of an object detected by the detection device and information on an object currently placed in the containment area, selects a complete pattern in which an object transported by the transport device can be stowed, from among the complete patterns stored in the storage unit. The control device includes a position determination unit that determines a position in which the object is placed inside the containment area on the basis of the complete pattern selected by the complete pattern selection unit. The robot transports the object to the position determined by the position determination unit.

In the above invention, the stowage device may be equipped with a temporary placement part that is capable of having an object placed temporarily thereon. The robot may place, in the temporary placement part, an object transported by the transport device upon no complete pattern being selected by the complete pattern selection unit.

In the above invention, upon the presence of a plurality of complete patterns in which an object can be stowed, the position determination unit may determine the position of the object so as to provide the greatest number of complete patterns corresponding to the object position when the object has been placed in the containment area.

DETAILED DESCRIPTION

A stowage pattern calculation device and a stowage device of embodiments are described below with reference to FIG. 1 to FIG. 15. The stowage pattern calculation device of the present embodiment is provided to the stowage device that stows box-shaped objects on a pallet. The stowage pattern calculation device calculates a pattern in which objects are placed inside a predetermined containment area. The stowage device places objects in the containment area on the basis of an object pattern generated by the stowage pattern calculation device.

Figure 1:
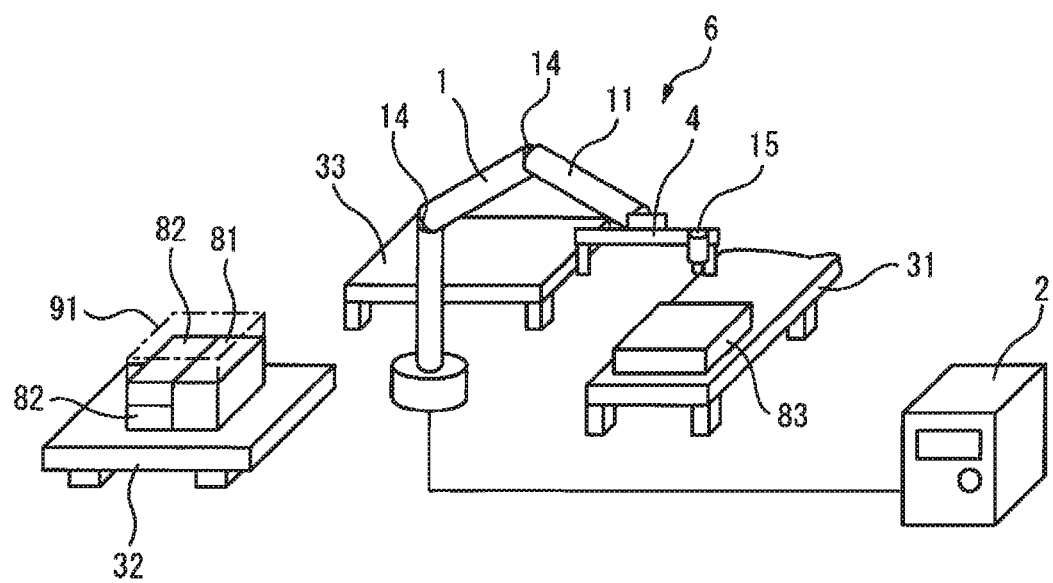
FIG. 1 is a schematic diagram of a stowage device of an embodiment.

FIG. 1 is a schematic diagram of the stowage device of the present embodiment. In the present embodiment, description will be given of an example in which a cuboid box is used as a box-shaped object. A stowage device 6 is equipped with a hand 4 serving as an end effector that grips boxes 81, 82, 83 to be transported, and a robot 1 that places the hand 4 in a desired position and orientation. The stowage device 6 is equipped with a control device 2 that controls the robot 1.

The robot 1 of the present embodiment is an articulated robot including an arm 11 and a plurality of joints 14. The robot 1 is capable of freely changing the position and orientation of a wrist portion of the arm 11. The robot 1 is capable of placing each of the boxes 81, 82, 83 gripped by the hand 4 in a desired position and orientation.

The stowage device 6 of the present embodiment is equipped with a conveyor 31 as a transport device. The stowage device 6 stows boxes transported by the conveyor 31, onto a pallet 32. A containment area 91 where boxes can be stowed is preset on the top face of the pallet 32. The containment area 91 of the present embodiment has a cuboid shape; however, without being limited to such a shape, any shape may be employed.

The boxes to be stowed on the pallet 32 are a plurality of types of boxes 81, 82, 83 that have different dimensions. The plurality of types of boxes 81, 82, 83 are transported by the conveyor 31 in a random sequence. In other words, there is no determined sequence for the types of boxes to be transported by the conveyor 31, and the boxes 81, 82, 83 are transported in a random sequence. Note that, without being limited to a conveyor as the transport device, any transport device capable of transporting objects may be employed.

The stowage device 6 sets positions where the boxes 81, 82, 83 are to be stowed inside the containment area 91. The robot 1 places the boxes in the positions set in the containment area 91. A temporary placement table 33, for temporarily placing the boxes 81, 82, 83, is provided as a temporary placement part in the present embodiment. The temporary placement table 33 provides a space in which each of the boxes 81, 82, 83 is temporarily placed.

Figure 2:
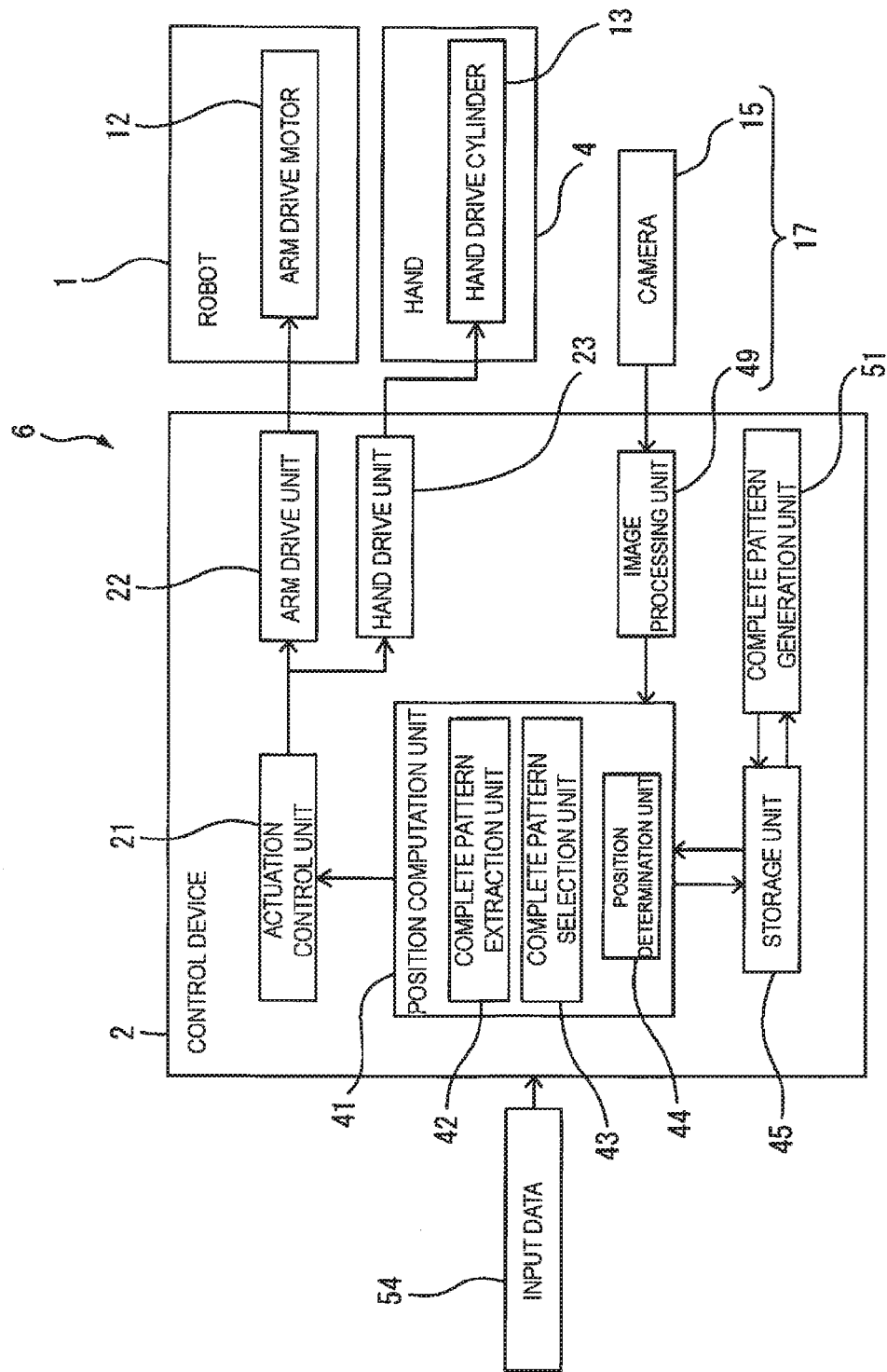
FIG. 2 is a block diagram of the stowage device of the embodiment.

FIG. 2 illustrates a block diagram of the stowage device of the present embodiment. With reference to FIG. 1 and FIG. 2, the robot 1 includes an arm drive device that drives each of the joints 14. The arm drive device includes an arm drive motor 12 coupled to each of the joints 14. Driving the arm drive motor 12 enables the corresponding joint 14 to move the arm 11 in a desired direction. The hand 4 is equipped with a hand drive device that closes and opens a claw part that grips a box. The hand drive device of the present embodiment includes a hand drive cylinder 13 that drives the hand 4 using air pressure. Note that any device capable of holding and releasing a box may be employed as the end effector.

The control device 2 includes an arithmetic processing device including a CPU (central processing unit), a RAM (random access memory), a ROM (read only memory), and the like connected with each other via a bus. The control device 2 includes an actuation control unit 21 that sends actuation commands for the robot 1 and the hand 4.

The actuation control unit 21 sends an actuation command for driving the arm drive motor 12 to an arm drive unit 22. The arm drive unit 22 includes an electrical circuit for driving the arm drive motor 12 and supplies electricity to the arm drive motor 12 in accordance with the actuation command. In addition, the actuation control unit 21 sends an actuation command for driving the hand drive device to a hand drive unit 23. The hand drive unit 23 includes an electrical circuit for driving an air pump and supplies compressed air to the hand drive cylinder 13 in accordance with the actuation command. Regulating the pressure of air supplied to the hand drive cylinder 13 causes the claw part of the hand 4 to open and close.

The stowage device 6 of the present embodiment is equipped with a detection device 17 that detects the type of a box transported by the conveyor 31. The detection device 17 of the present embodiment determines the type of a box on the basis of captured images of the boxes 81, 82, 83. The detection device 17 of the present embodiment includes a camera 15 fixed to the hand 4. Any camera, such as a two-dimensional camera or a three-dimensional camera, capable of detecting the type of a box may be employed as the camera 15. The detection device 17 includes an image processing unit 49 installed in the control device 2. The image processing unit 49 determines the type of a box transported by the conveyor 31 by analyzing images captured by the camera 15. Note that, without being limited to such a detection device, any desired device capable of detecting the type of a box transported by the transport device may be employed.

The control device 2 of the present embodiment functions as a stowage pattern calculation device. The stowage pattern calculation device is equipped with a complete pattern generation unit 51 that generates a complete pattern. The complete pattern is a pattern of boxes inside the containment area 91 when stowage is complete. The complete pattern includes a placement pattern in which all the boxes transported by the conveyor 31 are placed inside the containment area 91. The complete pattern generation unit 51 generates the complete pattern prior to performing a stowage task.

Figure 3:
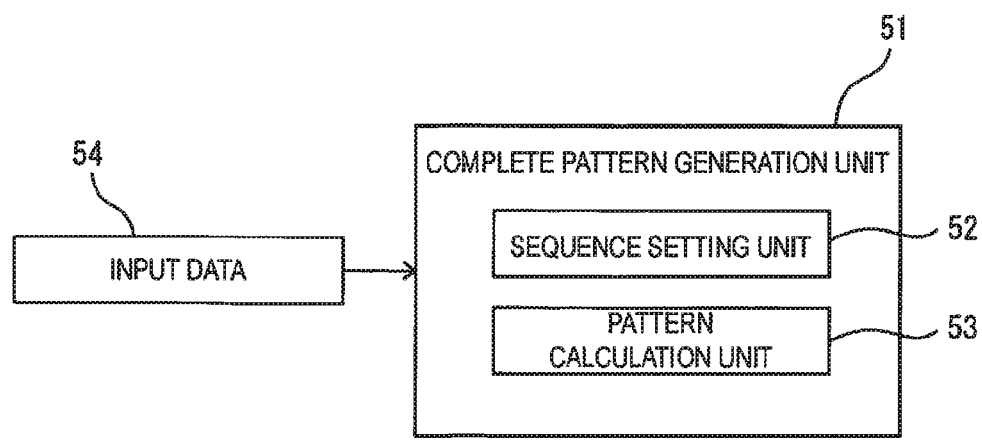
FIG. 3 is a block diagram of a complete pattern generation unit of the embodiment.

FIG. 3 illustrates a block diagram of the complete pattern generation unit of the embodiment. Input data 54, containing the types of boxes to be stowed in the current task and the number of boxes of each type, is input to the complete pattern generation unit 51. The input data 54 contains the shape and dimensions of the containment area 91, and the shapes and dimensions of the boxes 81, 82, 83. The input data 54 is stored in a storage unit 45 of the control device 2.

The complete pattern generation unit 51 is equipped with a sequence setting unit 52 that selects one or more objects and sets a stowage sequence of the objects. The complete pattern generation unit 51 is equipped with a pattern calculation unit 53 that generates at least one complete pattern. The pattern calculation unit 53 generates a complete pattern on the basis of the stowage sequence set by the sequence setting unit 52, the dimensions of the containment area 91, and the dimensions of a plurality of types of objects.

The stowage pattern calculation device is equipped with a storage unit that stores the complete pattern generated by the pattern calculation unit 53. In the present embodiment, the storage unit 45 of the control device 2 functions as the storage unit of the stowage pattern calculation device.

With reference to FIG. 2, the stowage device 6 of the present embodiment set the position of a box on the basis of the complete pattern generated by the stowage pattern calculation device. The control device 2 includes a position computation unit 41 that sets the position of a box inside the containment area 91.

The position computation unit 41 acquires the complete pattern from the storage unit 45. The input data 54, containing the types of boxes to be stowed in the current task and the number of boxes of each type, is input to the position computation unit 41. The input data 54 contains the respective dimensions of the boxes. The position computation unit 41 receives the type of a box detected by the image processing unit 49.

The position computation unit 41 includes a complete pattern selection unit 43 that selects a complete pattern in which objects to be transported by the transport device can be stowed. The complete pattern selection unit 43 selects a complete pattern in which objects can be stowed from among the complete patterns stored in the storage unit 45. The complete pattern selection unit 43 selects a complete pattern on the basis of the type of an object detected by the detection device 17 and information on an object currently placed in the containment area 91. The position computation unit 41 includes a position determination unit 44 that determines the position of an object to be placed on the basis of the complete pattern selected by the complete pattern selection unit 43.

Figure 4:
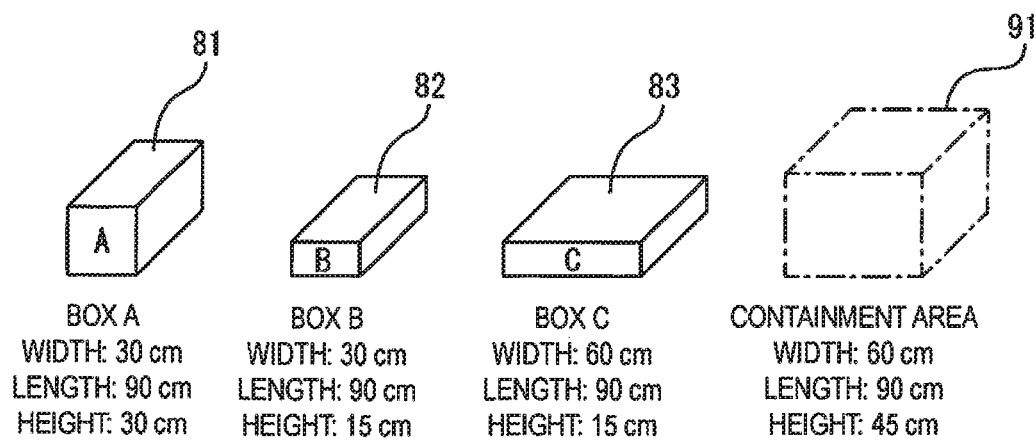
FIG. 4 is a diagram for explaining types of boxes and a containment area of the embodiment.

FIG. 4 illustrates the types of boxes and the containment area for explaining the present embodiment. In the present embodiment, the box 81 serving as a box A, the box 82 serving as a box B, and the box 83 serving as a box C are placed inside the containment area 91. The containment area 91 is set, for example, on the basis of a base area and height that enables the boxes to be stowed on the top face of the pallet 32. The box A, box B, and box C have cuboid shapes. In the present embodiment, description will be given of an example in which three types of boxes having the same length, but different widths and heights from each other are used.

Figure 5:
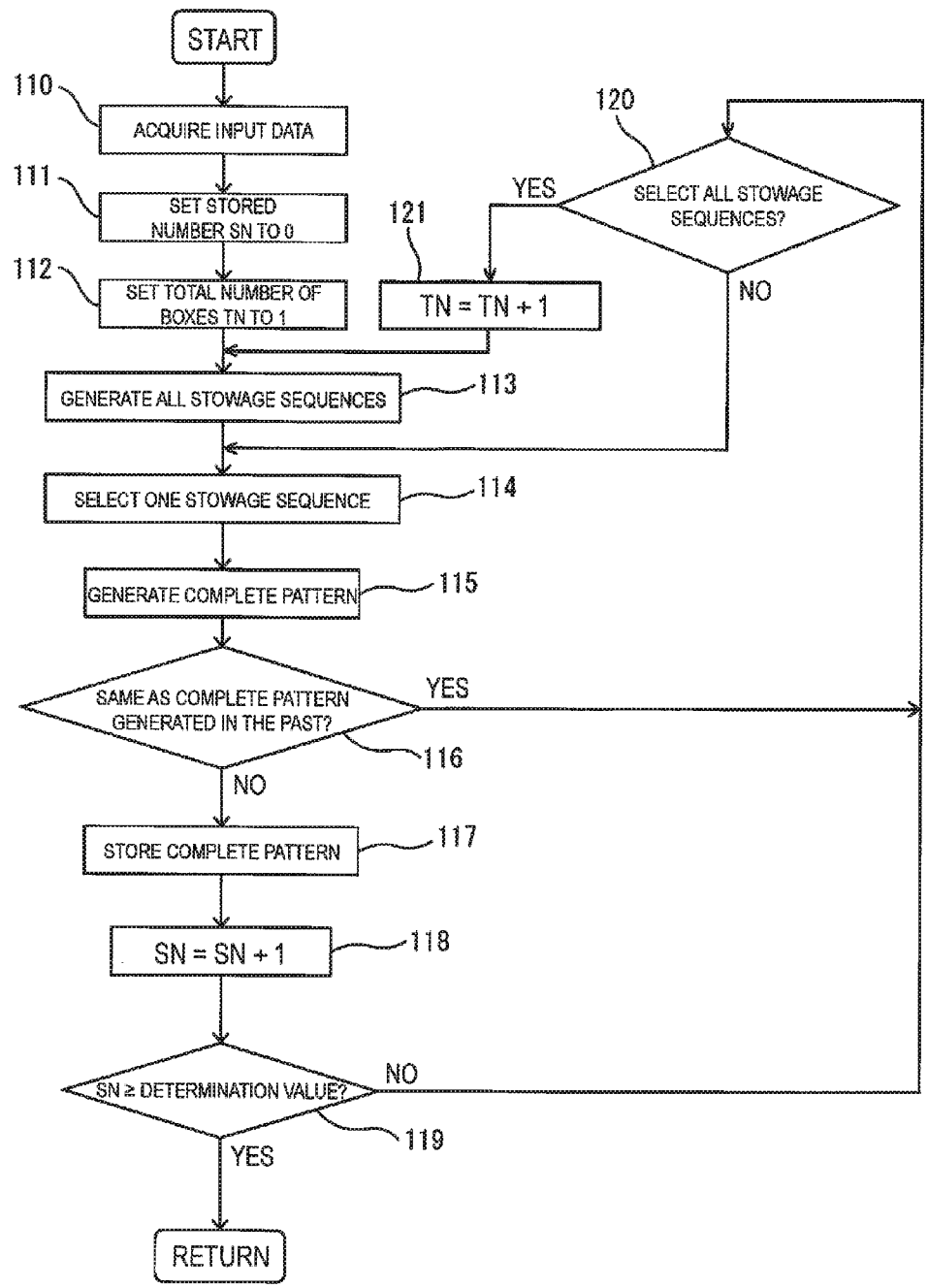
FIG. 5 is a flowchart of control for generating a complete pattern of the embodiment.

FIG. 5 illustrates a flowchart of a control for the complete pattern generation unit of the control device of the present embodiment. The complete pattern generation unit 51 generates a complete pattern, prior to performing a task in which the robot 1 transports the boxes 81, 82, 83.

With reference to FIG. 3 and FIG. 5, in step 110, the complete pattern generation unit 51 acquires the input data 54 stored in the storage unit 45. The complete pattern generation unit 51 retrieves the shapes and dimensions of the boxes, and the shape and dimensions of the containment area.

In step 111, the complete pattern generation unit 51 sets a stored number SN to 0, the stored number SN being the number of complete patterns stored in the storage unit 45. In the present embodiment, a complete pattern is repeatedly generated until the stored number SN becomes equal to a preset determination value.

In step 112, the complete pattern generation unit 51 sets a total number of boxes TN to 1. In the present embodiment, the total number of boxes TN is set, and then complete patterns are generated in proportion to the total number of boxes TN. In step 113, the sequence setting unit 52 creates all the stowage sequences corresponding to the total number of boxes TN. If the total number of boxes TN is 1, one stowage sequence is created. The storage unit 45 stores the stowage sequences created by the sequence setting unit 52.

Next, in step 114, the sequence setting unit 52 selects a stowage sequence from among the created box stowage sequences. If the total number of boxes TN is 1, the created stowage sequence is selected.

Next, in step 115, the pattern calculation unit 53 generates a complete pattern for the boxes to be placed inside the containment area 91. The pattern calculation unit 53 stows the boxes inside the containment area 91 in a predetermined sequence and generates the complete pattern. In the present embodiment, the boxes are stowed so as to make contact with one side of the containment area 91, as described below.

Next, in step 116, the pattern calculation unit 53 determines whether or not the complete pattern generated this time is the same as any of the complete patterns generated in the past. If the complete pattern generated this time is different from any of the complete patterns generated in the past, control proceeds to step 117. In step 117, the storage unit 45 of the control device 2 stores the complete pattern.

In step 118, the complete pattern generation unit 51 increments the stored number SN by 1. A complete pattern can accordingly be generated for the total number of boxes TN of 1. Next, a complete pattern is generated for the total number of boxes of 2 or greater.

In step 119, the complete pattern generation unit 51 determines whether or not the stored number SN is equal to or greater than the determination value. The determination value is a count for terminating the calculation, which prevents the generation of a complete pattern from falling into an infinite loop. The determination value may be preset by an operator. For example, the determination value to be compared with the stored number SN is preferably set to a large value such that all the complete patterns containable in the containment area 91 are generated.

In step 119, if the stored number SN is equal to the determination value, this control is terminated. In step 119, if the stored number SN is less than the determination value, control proceeds to step 120. Moreover, in step 116, if the complete pattern generated this time is the same as any one of the complete patterns stored in the storage unit 45, the generated complete pattern is not stored in the storage unit 45. Control proceeds to step 120.

In step 120, the complete pattern generation unit 51 determines whether or not all the stowage sequences stored in the storage unit 45 have been selected. If the total number of boxes TN is 1, it is determined that all the stowage sequences have been selected. In step 120, if it is determined that not all the stowage sequences have been selected, control proceeds to step 114. In step 114, the stowage sequence that have not been selected yet is selected.

In step 120, if it is determined that all the stowage sequences have been selected, control proceeds to step 121.

In step 121, the stored number SN is added by 1. Accordingly, a complete pattern is generated by the control from step 113 to step 120. The present embodiment enables the total number of boxes to be increased by 1 and enables complete patterns to be generated in proportion to the total number of boxes. Description will be given of an example in which the total number of boxes TN is 4 in step 121.

Figure 6:
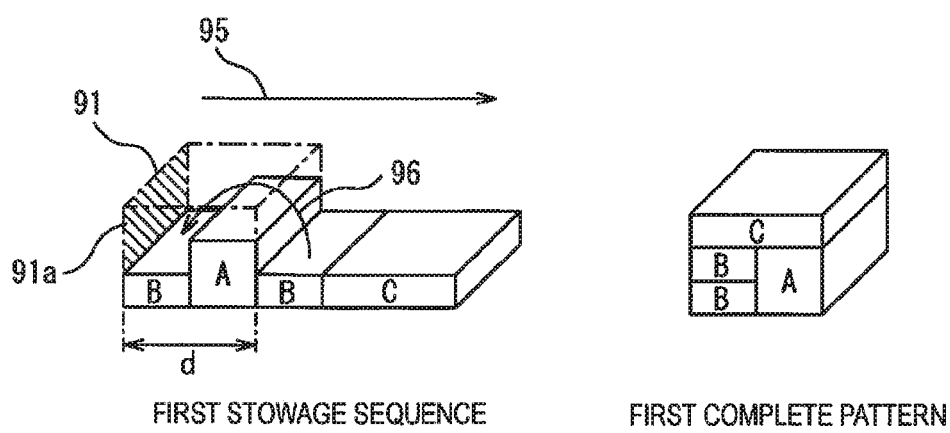
FIG. 6 is a diagram for explaining first stowage sequence and first complete pattern.
Figure 7:
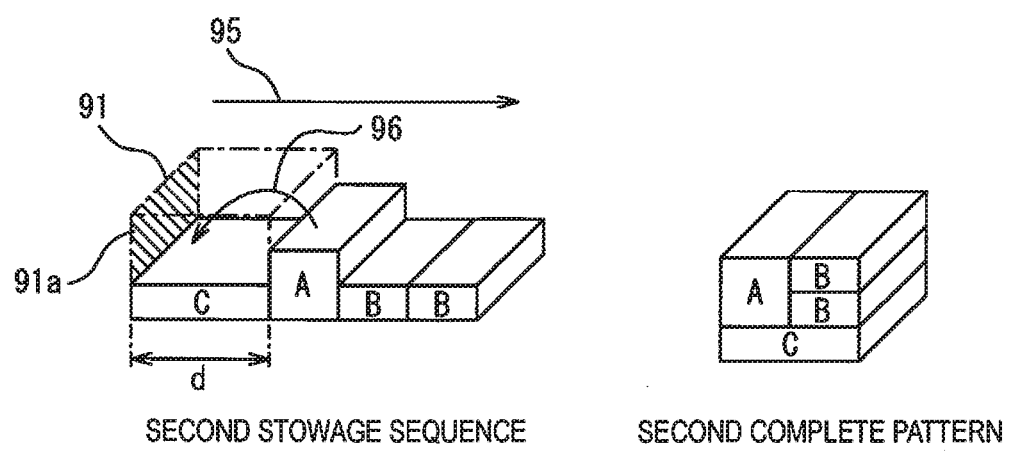
FIG. 7 is a diagram for explaining second stowage sequence and second complete pattern.

FIG. 6 illustrates an example of first stowage sequence and first complete pattern when the total number of boxes is 4. FIG. 7 illustrates an example of second stowage sequence and second complete pattern when the total number of boxes is 4. With reference to FIG. 5 to FIG. 7, in step 113, the sequence setting unit 52 generates all the stowage sequences for a case where the total number of boxes is 4. The sequence setting unit 52 sets the types of boxes and sequences. The sequence setting unit 52 generates, for example, the first stowage sequence illustrated in FIG. 6, and the second stowage sequence illustrated in FIG. 7.

The direction illustrated by arrow 95 corresponds to the stowage sequence. In the first stowage sequence, a box B is selected firstly, a box B is selected secondly, and a box C is selected thirdly. In the present embodiment, there are three types of boxes. Thus, when the total number of boxes is 4, 34 stowage sequences are created. In the present embodiment, the number of boxes of each type is not set; however, without being limited to such a configuration, an upper limit may be set for the number of boxes of each type.

Next, in step 114, the sequence setting unit 52 selects a stowage sequence from among the plurality of stowage sequences. For example, the sequence setting unit 52 selects the first stowage sequence illustrated in FIG. 6.

Next, in step 115, the pattern calculation unit 53 generates a complete pattern. In the present embodiment, the complete pattern is generated in accordance with the stowage sequences and a predetermined rule. With reference to FIG. 6, the pattern calculation unit 53 executes control to arrange, in one of the stowage sequences, the plurality of boxes in a predetermined placement direction of the containment area 91. If any box extends outside the containment area 91 in the placement direction, the pattern calculation unit 53 executes control to stow the box on the other boxes. In the present embodiment, the direction of a width d of the containment area 91 corresponds to the placement direction. Namely, the placement direction in the present embodiment is parallel to the horizontal direction.

The pattern calculation unit 53 stows the boxes such that the boxes are pressed toward one side face 91a of the containment area 91. The pattern calculation unit 53 places one of the boxes B such that a side face of the box B makes contact with the side face 91a of the containment area 91. Next, the pattern calculation unit 53 places the box A adjacent to the box B. The pattern calculation unit 53 places the box A such that the box A is pressed toward the side face 91a and against the box B. In this manner, the pattern calculation unit 53 executes control for arranging the boxes in the direction of the width of the containment area 91.

The pattern calculation unit 53 places the box B adjacent to the box A. The box B in its entirety is not within the containment area 91 in the direction of the width d. Accordingly, the pattern calculation unit 53 determines that placement of boxes of first layer has been completed. The pattern calculation unit 53 stows the box B as second layer, as indicated by arrow 96. In this case, the pattern calculation unit 53 stows the box B in one of the edges of the containment area 91 such that the box B is pressed against the side face 91a. Due to the top face of the box B of the first layer matching the bottom face of the box B of the second layer, the box B can be placed as indicated by arrow 96.

When the box C is next placed alongside the box A, the box C protrudes out from the containment area 91. The pattern calculation unit 53 accordingly places the box C on the box A and the box B of the second layer. At this time, the whole of the bottom face of the box C to be newly stowed and the top faces of the boxes A, B that have already been stowed make contact with each other. This causes the pattern calculation unit 53 to determine that stowage of the box is possible. The first complete pattern can be formed in this manner.

With reference to FIG. 7, the complete pattern in the second stowage sequence can be generated by similar control. The pattern calculation unit 53 places the box C such that the box C makes contact with the side face 91a of the containment area 91. When the box A is placed alongside the box C, the box A extends outside the containment area 91. The pattern calculation unit 53 accordingly places the box A on the box C, as indicated by arrow 96. The pattern calculation unit 53 places the box A such that the box A makes contact with the side face 91a of the containment area 91. Next, the pattern calculation unit 53 places the first box B on the box C. Even when the second box B is next placed on the first box B, the second box B is placed inside the containment area 91. The pattern calculation unit 53 accordingly places the second box B on the first box B. The second complete pattern can be formed in this manner.

The complete patterns can be generated in accordance with a predetermined rule. In the present embodiment, the pattern calculation unit 53 places, in the stowage sequence, boxes in a row in the containment area 91. The pattern calculation unit 53 places the boxes close to the side face 91a of the containment area 91 without gaps between the boxes. When the width of the stowed boxes has exceeded the width of the containment area 91, the pattern calculation unit 53 executes control for stowing a box on the other boxes.

In the control for stowing a box on the other boxes, a case may arise in which the whole of the bottom face of a box to be newly stowed does not make contact with any of the top faces of the already stowed boxes. This causes the pattern calculation unit 53 to determine that the new box cannot be stowed on the boxes. In this case, the pattern prior to stowing the new box results in a complete pattern. Alternatively, if the height of the stowed boxes exceeds the height of the containment area 91 when a new box is stowed on the boxes, the pattern calculation unit 53 determines that the new box cannot be stowed on the boxes. In this case, too, the pattern prior to stowing the new box results in a complete pattern.

Note that any rule may be employed as a rule for generating a complete pattern. For example, in the present embodiment, it is required that the whole of the bottom face of the box to be newly stowed make contact with any of the top faces of the already stowed boxes. However, if a predetermined proportion of the bottom face of the box to be newly stowed makes contact with any of the top faces of the already stowed boxes, the pattern calculation unit 53 may determine that the new box may be stowed.

Note that the pattern calculation unit in the present embodiment executes control for arranging the boxes in the width direction of the containment area in the sequence set by the sequence setting unit; however, without being limited to such control, a control for arranging a plurality of objects in a predetermined placement direction of the containment area can be performed. For example, the pattern calculation unit may execute control for arranging a plurality of boxes in a height direction and control for stowing an object alongside of the other objects when the object extends outside the containment area.

With reference to FIG. 5, in step 116, if the complete pattern created this time is the same as any of the complete patterns created in the past, the pattern calculation unit 53 discards the created pattern and control proceeds to step 120. In step 116, if the complete pattern created this time is not the same as any of the complete patterns created in the past, control proceeds to step 117.

In step 117, the storage unit 45 stores the complete pattern created this time. In step 118, the complete pattern generation unit 51 increments the stored number SN by 1. In step 119, if the stored number SN is equal to or greater than the determination value, control is terminated. In step 119, if the stored number SN is less than the determination value, control proceeds to step 120.

In step 120, determination is made as to whether or not all the stowage sequences created in step 113 have been selected. If it is determined that not all the stowage sequences have been selected, control proceeds to step 114 and a new stowage sequence is selected. The control for generating a complete pattern in the selected stowage sequence is executed.

In step 120, if it is determined that all the stowage sequences have been selected, control proceeds to step 121 and the stored number SN is added by 1. The generation of a complete pattern is repeated for the increased total number of boxes.

The complete pattern generation unit 51 is capable of generating complete patterns in this manner by sequentially increasing the total number of boxes to be stowed by 1. Moreover, the pattern calculation unit 53 repeatedly executes control for the plurality of stowage sequences, the control being executed so as to set a pattern as a complete pattern in which boxes are contained in the containment area 91 when the boxes are stowed in one of the stowage sequences. If the stored number SN of the complete patterns stored in the storage unit 45 is equal to or greater than the determination value, control is terminated. All the generated complete patterns are stored in the storage unit 45.

The stowage pattern calculation device of the present embodiment is capable of calculating a pattern in which objects can be placed inside the containment area. Note that the pattern calculation unit is capable of generating a complete pattern in any method, without being limited to the above control for generating a pattern. For example, the pattern calculation unit may place boxes irregularly in the containment area so as to generate a complete pattern. The pattern calculation unit may select, from among the irregularly created patterns, a pattern in which boxes are placed in the containment area and sets the pattern as a complete pattern.

Next, description will be given of the object stowage device 6 of the present embodiment. The stowage device 6 places boxes transported by the conveyor 31 inside the containment area 91 on the basis of pregenerated complete patterns.

Figure 8:
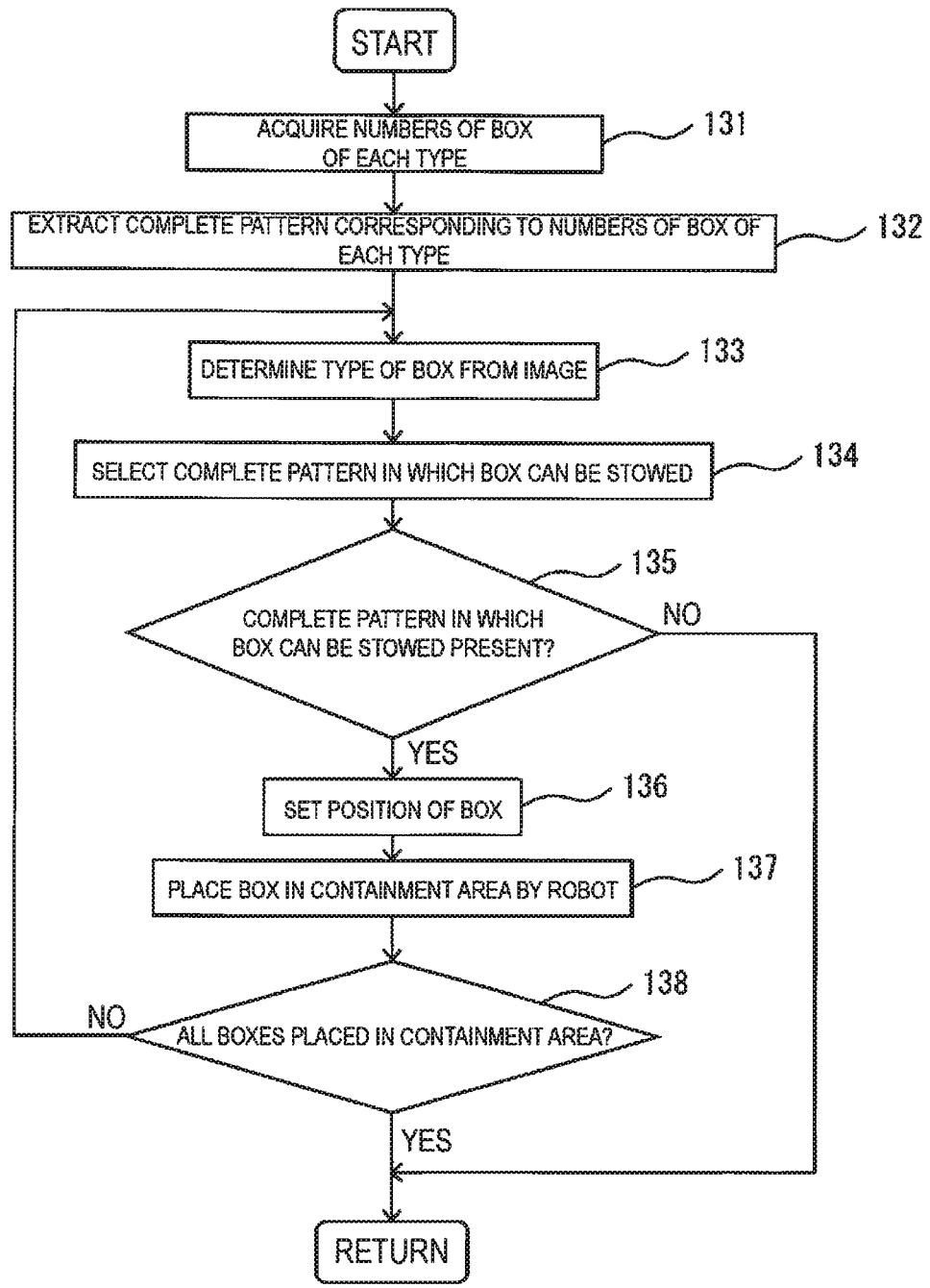
FIG. 8 is a flowchart of first stowage control of the embodiment.

FIG. 8 is a flowchart of the first stowage control of the stowage device of the present embodiment. In the present embodiment, the number of boxes of each type to be transported by the conveyor is predetermined. Thus, the total number of boxes to be stowed is also predetermined. The plurality of boxes are transported in a random sequence.

With reference to FIG. 1, FIG. 2, and FIG. 8, in step 131, the position computation unit 41 of the control device 2 retrieves, from the input data 54, the number of boxes of each type to be transported by the conveyor 31.

Next, in step 132, a complete pattern extraction unit 42 extracts, from the complete patterns stored in the storage unit 45, a complete pattern corresponding to the number of boxes of each type. In the present embodiment, description will be given of an example in which the plurality of boxes include one box A, two boxes B, and one box C, as illustrated in FIG. 6 and FIG. 7. The complete pattern extraction unit 42 extracts all the complete patterns, each of which is constituted of one box A, two boxes B, and one box C. The extracted complete patterns are stored in the storage unit 45.

In step 133, the conveyor 31 transports one box. The camera 15 images the box transported by the conveyor 31. The image processing unit 49 of the control device 2 determines the type of the box on the basis of the image captured by the camera 15. The storage unit 45 stores the type of the box transported by the conveyor 31. At this time, the robot 1 is on standby without executing a task of gripping the box.

In the next step 134, the complete pattern selection unit 43 selects a complete pattern in which the box can be stowed, from among the complete patterns extracted in step 132. The complete pattern selection unit 43 selects a complete pattern in which the box can be stowed on the basis of information on the boxes currently placed in the containment area 91 and the type of the box to be stowed. The complete pattern selection unit 43 selects one or more complete patterns from among the complete patterns stored in the storage unit 45.

Figure 9:
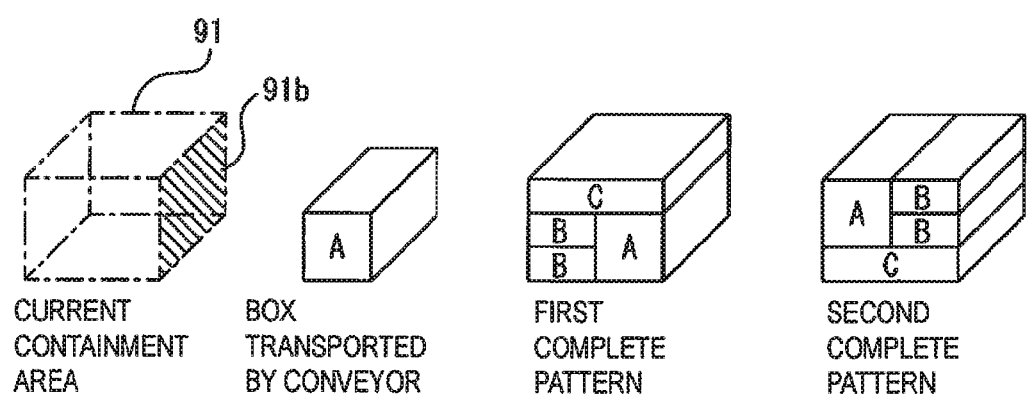
FIG. 9 is a diagram of the containment area, boxes transported by a conveyor, and complete patterns for explaining the first stowage control.

FIG. 9 illustrates perspective views of the containment area and boxes for explaining the first stowage control. In this example, the containment area 91 currently has no boxes placed therein. A box A is transported by the conveyor 31. The complete patterns extracted by the complete pattern extraction unit 42 include the first complete pattern and the second complete pattern. Due to no boxes being currently placed in the containment area 91, the box A is placed on the bottom face of the containment area 91. Thus, the first complete pattern can be formed, but the second complete pattern cannot be formed. The complete pattern selection unit 43 selects the first complete pattern as a complete pattern in which the box can be stowed. The complete pattern selection unit 43 does not select the second complete pattern. When a plurality of complete patterns in which the box can be stowed are present, the complete pattern selection unit 43 selects all the complete patterns in which the box can be stowed.

In step 135, after the determination for all the complete patterns, the complete pattern selection unit 43 determines whether or not a complete pattern in which the box can be stowed is present. In step 135, if it is determined that no complete pattern in which the box can be stowed is present, control is terminated. In this case, for example, the control device 2 displays a warning on a display so as to notify the operator that the box cannot be stowed. In step 135, if a complete pattern in which the box can be stowed is present, control proceeds to step 136.

In step 136, the position determination unit 44 sets the position of the box in the containment area 91. If a plurality of complete patterns in which the box can be stowed are present, the position determination unit 44 is allowed to select any complete pattern. In this example, the complete pattern selected first in step 134 is employed. With reference to FIG. 9, for example, the position determination unit 44 selects the first complete pattern. The position determination unit 44 determines that the box A is placed so as to make contact with the other side face 91b of the containment area 91.

In step 137, the position computation unit 41 sends the position set by the position determination unit 44 to the actuation control unit 21. The actuation control unit 21 controls the robot 1 and the hand 4 so as to place the box A in the indicated position. The robot 1 thereby places the box A in the containment area 91. The storage unit 45 stores the position where the box A has been placed in the containment area 91. Information including the types and positions of boxes which have been placed in the containment area 91 is stored in the storage unit 45.

Next, in step 138, the position computation unit 41 determines whether or not all the boxes have been placed in the containment area 91 on the basis of the types of the boxes and the number of the boxes inside the containment area 91 stored in the storage unit 45. In step 138, if it is determined that not all the boxes have been placed in the containment area 91, control returns to step 133. Accordingly, a box transported by the conveyor 31 is placed by the control from step 133 to step 137. In step 138, if it is determined that all the boxes have been placed in the containment area 91, this control is terminated.

In this manner, the object stowage device 6 of the present embodiment determines the position of a box on the basis of the type of a box to be newly stowed, the types of boxes and number of boxes currently in the containment area 91, and the complete pattern selected by the complete pattern selection unit 43. Executing such control enables the boxes to be stowed in the containment area even when the types of objects transported by a conveyor are in a random sequence.

In the above-described embodiment, the number of boxes is predetermined for each of the types of boxes transported by the conveyor 31. The control of the stowage device is not limited to such an embodiment, and the present invention may be applied to embodiments in which the total number of boxes has been predetermined, but the number of boxes of each type has not been determined.

In this case, the complete pattern extraction unit 42 is allowed to extract all the complete patterns corresponding to the total number of boxes in step 132. In step 134, the complete pattern selection unit 43 selects a complete pattern in which the box can be stowed. In step 135, the position determination unit 44 is allowed to set the position in which the box is stowed.

Moreover, the present invention may also be applied even when the types and total number of boxes transported by the conveyor 31 are undefined. In this case, the complete pattern extraction unit 42 is allowed to extract, in step 132, a complete pattern generated by the complete pattern generation unit 51. In step 135, the position determination unit 44 is allowed to set the position in which the box is stowed. In step 138, the camera 15 captures an image in a predetermined position on the conveyor 31. If no box is present in the image, the position computation unit 41 is allowed to determine that all the boxes have been placed in the containment area 91.

Figure 10:
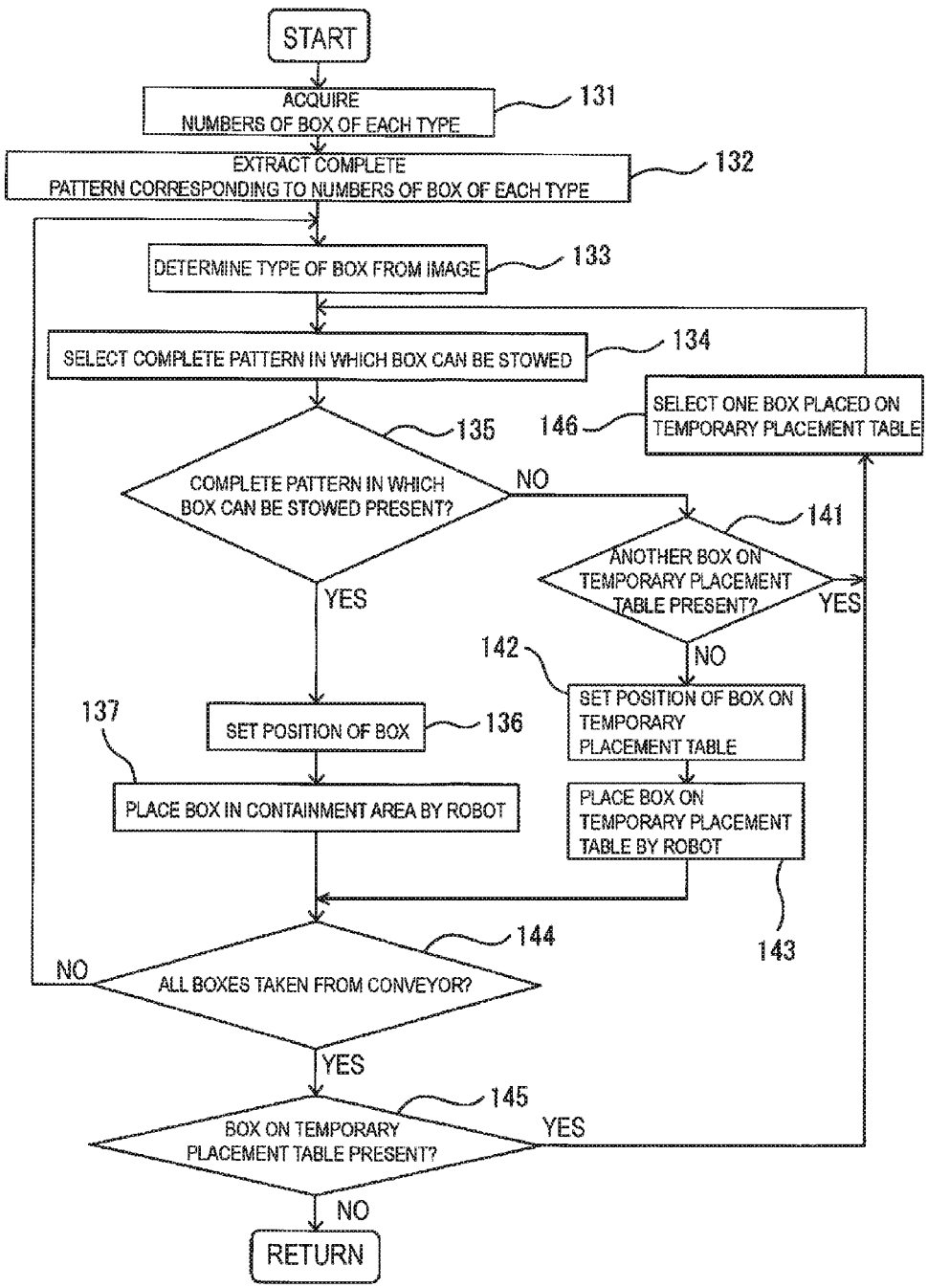
FIG. 10 is a flowchart of second stowage control of the embodiment.

FIG. 10 illustrates a flowchart of second stowage control of the stowage device in the present embodiment. In the second stowage control, if it is determined that no corresponding complete pattern is present and a box cannot be stowed, control for placing the box temporarily on the temporary placement table 33 is executed. Control from step 131 to step 135 is similar to that of the first stowage control.

Figure 11:
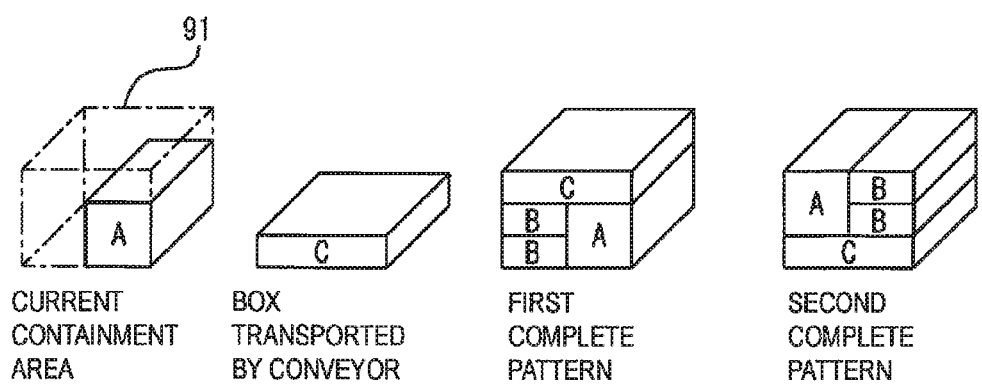
FIG. 11 is an explanatory diagram of the containment area, boxes transported by a conveyor, and complete patterns for explaining the second stowage control.

FIG. 11 illustrates the containment area, boxes transported by a conveyor, and complete patterns for explaining the second stowage control. In this example, one box A is currently placed in the containment area 91. The conveyor 31 transports a box C. Description will be given of an example in which the complete pattern extraction unit 42 extracts the first complete pattern and the second complete pattern.

With reference to FIG. 2, FIG. 10, and FIG. 11, in order to generate the first complete pattern, two boxes B need to be stowed before the box C is stowed. Moreover, the box C needs to be placed at the bottom of the containment area 91 in order to generate the second complete pattern. Thus, the complete pattern selection unit 43 does not select all the complete patterns in step 134. In step 135, the complete pattern selection unit 43 determines that no complete pattern is present in which the box can be stowed. Control proceeds to step 141.

In step 141, the position computation unit 41 determines whether or not any other box that is not assumed to be placed in the containment area 91 is placed on the temporary placement table 33. Sometimes there is a box already placed on the temporary placement table 33 when the robot 1 is about to place a box on the temporary placement table 33. Control proceeds to step 142 if, in step 141, any other box has not been placed on the temporary placement table 33. Namely, control proceeds to step 142 if no boxes have been placed on the temporary placement table 33. Moreover, control proceeds to step 142 if none of the boxes placed on the temporary placement table 33 can be placed in the containment area 91.

In step 142, the position determination unit 44 determines that the box C is placed on the temporary placement table 33. The position determination unit 44 sets the position of the box C on the temporary placement table 33 on the basis of the types and number of boxes currently placed on the temporary placement table 33. If any box has already been placed on the temporary placement table 33, the position is set so as to avoid the position of the already-placed box.

In step 143, the position computation unit 41 sends the set position to the actuation control unit 21. The robot 1 grips the box C transported by the conveyor 31. The robot 1 places the box C on the temporary placement table 33 in the indicated position. Here, the storage unit 45 stores the type and position of the box C on the temporary placement table 33. In this manner, if a box transported by the conveyor 31 cannot be placed in the containment area 91, the box can be temporarily placed on the temporary placement table 33. Next, control proceeds to step 144.

In step 144, the position computation unit 41 determines whether or not all the predetermined boxes have been transported by the conveyor 31 and taken from the conveyor 31. The types and number of boxes transported by the conveyor 31 are stored in the storage unit 45. If not all the boxes have been transported by the conveyor 31 or any box has been left on the conveyor 31, control returns to step 133. The control device 2 repeats control for placing transported boxes. If all the boxes have been taken from the conveyor 31 in step 144, control proceeds to step 145.

On the other hand, if other boxes that are not assumed to be placed in the containment area 91 have been placed on the temporary placement table 33 in step 141, control proceeds to step 146. In step 146, the position computation unit 41 selects one of the other boxes placed on the temporary placement table 33. Control returns to step 134. The complete pattern selection unit 43 selects a complete pattern in which the selected box can be stowed. Namely, the complete pattern selection unit 43 selects a complete pattern in which the box placed on the temporary placement table 33 can be stowed.

Next, if it is determined that any complete pattern in which the box can be stowed is present in step 135, control proceeds to step 136. In step 136, the position determination unit 44 determines a position of the box in the containment area 91. Next, in step 137, the robot 1 places the box placed on the temporary placement table 33 in the indicated position in the containment area 91. Next, if the position computation unit 41 determines that some of the boxes have not been taken from the conveyor 31 in step 144, control returns to step 133 in which placement of the box transported by the conveyor 31 is examined.

If it is determined that no complete pattern in which the other box can be stowed is present in step 135, control proceeds to step 141. In step 141, the position computation unit 41 determines whether or not any other boxes, which have not been examined for placement in the containment area 91, have been placed on the temporary placement table 33. If it is determined that any other boxes are present in step 141, one of the other boxes is selected in step 146, and placement of the other box is examined.

In this manner, if the box transported by the conveyor 31 cannot be placed in the containment area 91, the position computation unit 41 determines, for all of the boxes placed on the temporary placement table 33, whether or not these boxes can be placed in the containment area 91. If it is determined that a box placed on the temporary placement table 33 can be placed in the containment area 91, this box is placed in the containment area 91. Next, control proceeds to step 133, and determination is made as to whether or not a box transported by the conveyor 31 can be placed in the containment area 91.

In step 145, the position computation unit 41 determines whether or not any box has been left on the temporary placement table 33. If it is determined that a box has been left on the temporary placement table 33 in step 145, control proceeds to step 146. The control proceeds to step 134 after one of the boxes placed on the temporary placement table 33 has been selected in step 146. In this manner, a box placed on the temporary placement table 33 can be placed in the containment area 91 after all the boxes have been taken from the conveyor.

In step 145, if no boxes have been placed on the temporary placement table 33, determination can be made that all the boxes have been placed in the containment area 91. The above case causes control to be terminated.

In the second stowage control, the robot 1 can place a box on the temporary placement table 33 if no complete pattern has been selected by the complete pattern selection unit 43. Namely, the robot 1 can place a box on the temporary placement table 33 if it is determined that no complete pattern in which the box can be stowed is present. Executing such control raises the possibility of completing stowage of boxes. In the present embodiment, the temporary placement table 33 is formed large enough to enable all of a plurality of boxes to be placed on the temporary placement table 33. Thus, temporarily placing boxes on the temporary placement table 33 allows a complete pattern to be reliably generated.

Figure 12:
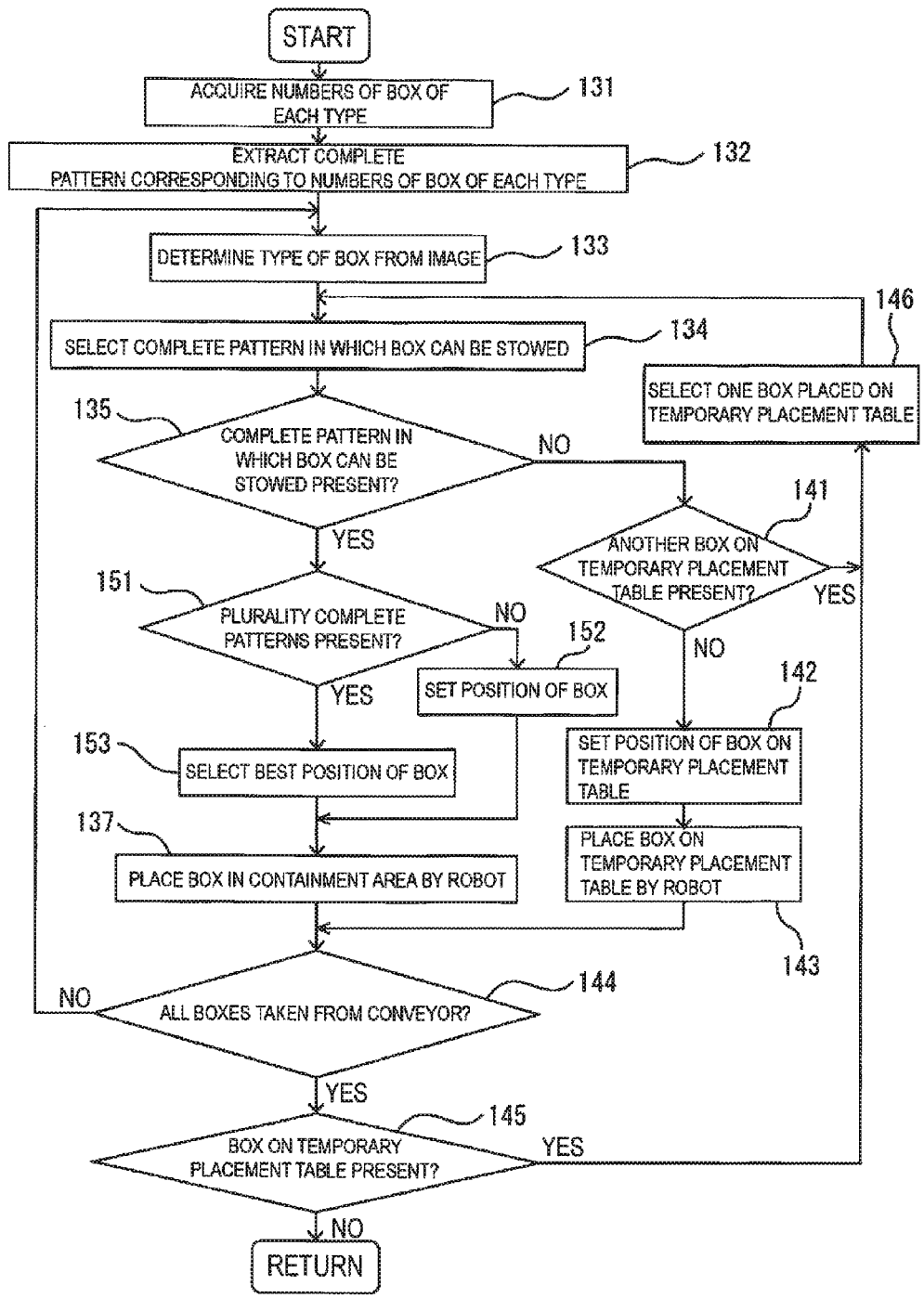
FIG. 12 is a flowchart of third stowage control of the embodiment.

FIG. 12 illustrates a flowchart of third stowage control in the present embodiment. In the third stowage control, if a plurality of complete patterns in which a box can be stowed are present, control for selecting the most appropriate complete pattern is executed. Control from step 131 to step 135 and control from step 141 to step 146 are similar to that of the second stowage control. In the third stowage control, if it is determined that a complete pattern in which the box can be stowed is present in step 135, control proceeds to step 151.

In step 151, the position determination unit 44 determines whether or not a plurality of complete patterns in which the box can be stowed are present. If it is determined that a plurality of complete patterns are not present in step 151, control proceeds to step 152. In this case, one complete pattern in which the box can be stowed is present. In step 152, the position determination unit 44 sets the position of the box in the containment area 91 on the basis of the complete pattern.

If it is determined that a plurality of complete patterns in which the box can be stowed are present in step 151, control proceeds to step 153. In step 153, the position determination unit 44 selects the position in which the box is placed on the basis of the plurality of complete patterns. In the third stowage control, the position determination unit 44 determines the position of the box so as to provide the greatest number of complete patterns corresponding the position of the box when the box is placed in the containment area 91.

Figure 13:
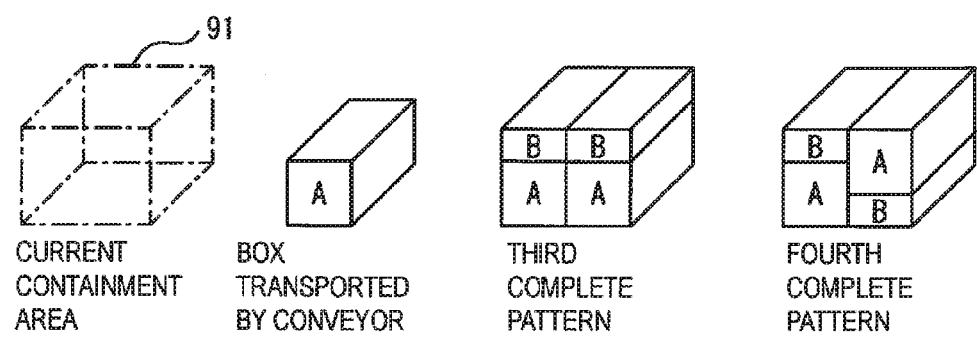
FIG. 13 is a diagram of the containment area, boxes transported by a conveyor, and complete patterns for explaining the third stowage control.

FIG. 13 illustrates the containment area, boxes transported by a conveyor, and complete patterns for explaining the third stowage control. In this example, the containment area 91 currently has no boxes placed therein. The conveyor 31 transports a box A. Third complete pattern and fourth complete pattern are selected by the complete pattern selection unit 43 as complete patterns. In this example, the box A can be stowed in both complete patterns.

Figure 14:
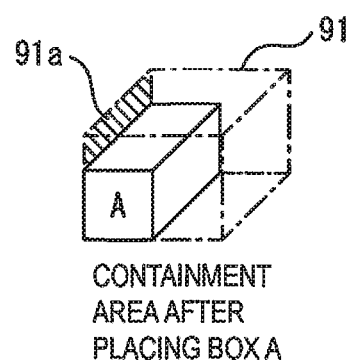
FIG. 14 is a diagram of first example of a box placed in the containment area.
Figure 15:
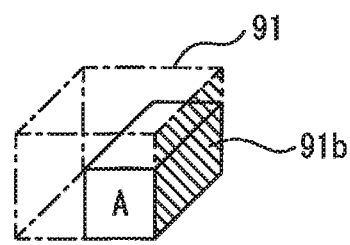
FIG. 15 is a diagram of second example of a box placed in the containment area.

FIG. 14 illustrates first perspective view of a box placed in the containment area. FIG. 15 illustrates second perspective view of a box placed in the containment area. As illustrated in FIG. 14, the box A can be placed so as to make contact with one side face 91a of the containment area 91. Moreover, as illustrated in FIG. 15, the box A can be placed so as to make contact with the other side face 91b.

The third complete pattern and the fourth complete pattern correspond to the position of the box A when the box A is placed as illustrated in FIG. 14. Namely, the position of the box A corresponds to two complete patterns. On the other hand, the third complete pattern corresponds to the position of the box A when the box A is placed as illustrated in FIG. 15. Namely, the position of box A corresponds to only one complete pattern.

With reference to FIG. 12, The position determination unit 44 sets the position illustrated in FIG. 14, so as to provide more complete patterns corresponding to the position of the box A. In step 137, the robot 1 places the box A in the set position.

In the third stowage control, the possibility of not being able to stow the box is suppressed due to selecting the position of the box so as to provide the greatest number of complete patterns. Moreover, the number of times the temporary placement table 33 is used can be reduced, and the time for stowing the boxes can be shortened. Note that similar control can also be executed when stowing, in the containment area 91, boxes placed on the temporary placement table 33.

In the present embodiment, the control device functions as the stowage pattern calculation device; however, without being limited to such a configuration, the stowage pattern calculation device may be constituted of an arithmetic processing device separate from the control device. In this configuration, the complete patterns generated by the stowage pattern calculation device can be sent to the control

The invention claimed is:

1. A stowage pattern calculation device configured to calculate a pattern in which a plurality of objects are stowed inside a predetermined containment area, the plurality of objects having box shapes and being of a plurality of types having different dimensions from each other, the stowage pattern calculation device comprising:
a sequence setting unit configured to select a plurality of objects and set a stowage sequence in which the objects are stowed;
a pattern calculation unit configured to generate a complete pattern in which the objects are placed inside the containment area on the basis of dimensions of the containment area, dimensions of the plurality of types of objects, and the stowage sequence set by the sequence setting unit; and
a storage unit configured to store the complete pattern generated by the pattern calculation unit;
wherein
the sequence setting unit is configured to set a plurality of the stowage sequences,
the pattern calculation unit is configured to repeatedly execute control based on the plurality of stowage sequences to:
set a pattern, based on one of the plurality of stowage sequences, in which objects are contained inside the containment area when the objects are stowed in said one of the plurality of stowage sequences, as the complete pattern, and
obtain a plurality of complete patterns corresponding to the plurality of stowage sequences, and
the pattern calculation unit is configured to set the complete pattern corresponding to one of the plurality of stowage sequences by
arranging the plurality of objects adjacent to each other in a predetermined placement direction of the containment area in said one of the plurality of stowage sequences; and
in response to a determination that an object among the plurality of objects is located outside the containment area in the predetermined placement direction, stowing the object on top of the other objects in the containment area.

2. A stowage device comprising:
a transport device configured to transport a plurality of types of objects in a random sequence;
a robot configured to place the objects transported by the transport device inside a predetermined containment area;
a detection device configured to detect types of the objects transported by the transport device; and
a control device configured to set a position of an object inside the containment area;
wherein
the control device includes:
a pattern calculation unit configured to generate a complete pattern in which the plurality of types of objects are placed inside the containment area on the basis of dimensions of the containment area, dimensions of the plurality of types of objects, and a stowage sequence in which the plurality of types of objects are stowed;
a storage unit configured to store the plurality of complete patterns generated by the pattern calculation unit;
a complete pattern selection unit configured to, on the basis of the types of the objects detected by the detection device and information on an object currently placed in the containment area, select one of the plurality of complete patterns; and
a position determination unit that determines a position in which the object is placed inside the containment area on the basis of the complete pattern selected by the complete pattern selection unit,
the pattern calculation unit is configured to repeatedly execute control based on a plurality of the stowage sequences to
set a pattern, based on one of the plurality of stowage sequences, in which objects are contained inside the containment area when the objects are stowed in said one of the plurality of stowage sequences, as the complete pattern, and
obtain a plurality of complete patterns corresponding to the plurality of stowage sequences,
the pattern calculation unit is configured to set the complete pattern corresponding to the one of the plurality of stowage sequences by
arranging the plurality of objects adjacent to each other in a predetermined placement direction of the containment area in said one of the plurality of stowage sequences; and
in response to a determination that an object among the plurality of objects is located outside the containment area in the predetermined placement direction, stowing the object on top of the other objects in the containment area, and
the robot is configured to transport the object to the position determined by the position determination unit.

3. The stowage device according to claim 2, further comprising a temporary placement part configured to temporarily hold one of the objects thereon,
wherein the robot is configured to place the objects transported by the transport device on the temporary placement part upon no complete pattern being selected by the complete pattern selection unit.

4. The stowage device according to claim 2, wherein, upon the plurality of complete patterns in which one of the objects can be stowed being obtained, the position determination unit is configured to determine the position of the object to provide the greatest number of complete patterns corresponding to the position of the object when the object is placed in the containment area.

* * * * *